2 Sheets--Sheet 1.

J. W. TUCK.
Machines for Dressing the Knuckle-Joints of Hinges.

No. 155,686. Patented Oct. 6, 1874.

WITNESSES.     INVENTOR.

J. W. TUCK.
Machines for Dressing the Knuckle-Joints of Hinges.
No. 155,686. Patented Oct. 6, 1874.

WITNESSES.

INVENTOR.
J. Warren Tuck
per Benj. F. Thurston
atty

UNITED STATES PATENT OFFICE.

J. WARREN TUCK, OF NEW BRITAIN, CONNECTICUT, ASSIGNOR TO THE UNION MANUFACTURING COMPANY.

IMPROVEMENT IN MACHINES FOR DRESSING THE KNUCKLE-JOINTS OF HINGES.

Specification forming part of Letters Patent No. 155,686, dated October 6, 1874; application filed September 7, 1874.

*To all whom it may concern:*

Be it known that I, J. WARREN TUCK, of New Britain, in the county of Hartford and State of Connecticut, have invented certain new and useful Improvements in Machines for Dressing and Squaring the Faces of the Knuckle-Joints of Hinges; and I do hereby declare that the following specification, taken in connection with the drawings making a part of the same, is a full, clear, and exact description thereof.

Figure 1:
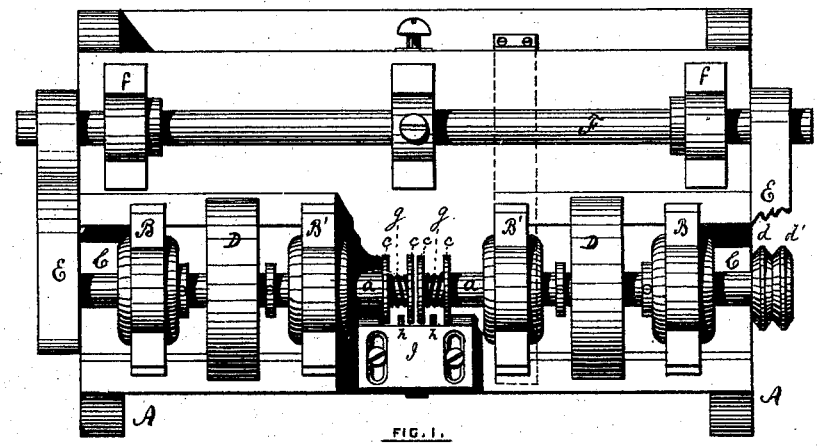
Figures 2, 3:
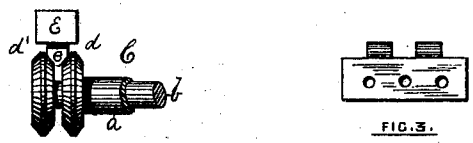
Figure 4:
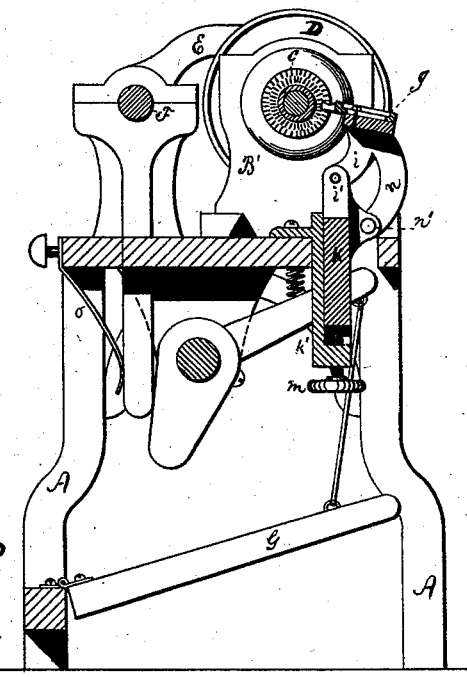
Figure 5:
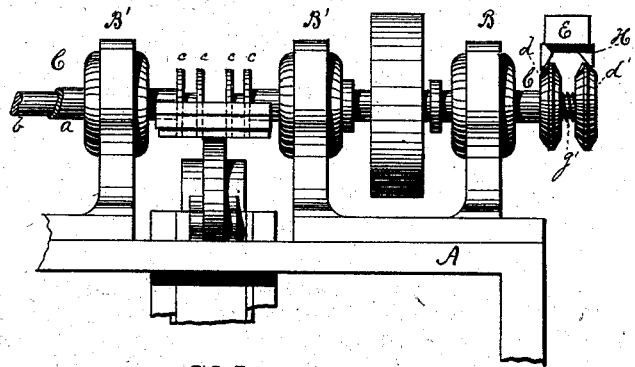
Figure 7:
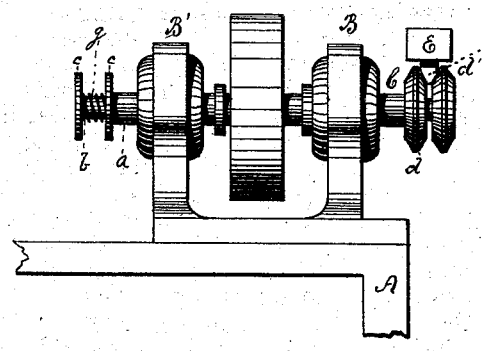
Figure 9:
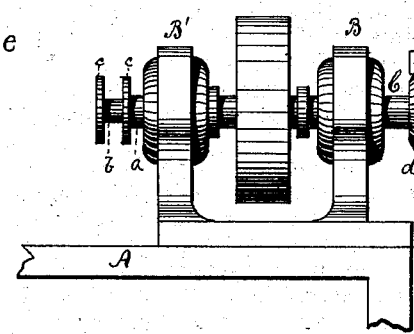
Figure 8:
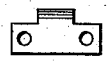

Figure 1 is a top view, showing the arrangement of the machine for dressing the joints of the male leaf of the hinge shown at Fig. 3. Fig. 2 is a detached part of Fig. 1, and shows the device for causing the sets of milling-tools employed to be moved laterally toward each other. (See also Fig. 7.) Fig. 4 is a vertical and transverse section in a plane midway between the two ends of the machine. Fig. 5 is a front view, showing the machine arranged to dress the joints of the female leaf of the hinge shown at Fig. 6. Figs. 7 and 9 are, respectively, front views of the same machines in principle shown at Figs. 1 and 5, with the exception that Figs. 1 and 5 represent machines which are duplications of the machines shown at Figs. 7 and 9, the latter being arranged to dress the male and female leaves of the variety of hinges only shown at Figs. 8 and 10. Fig. 11 represents the machine as arranged to dress the loose butt-hinge shown at Fig. 11.

The object of my invention is to provide a machine for expeditiously and accurately dressing the knuckle-joint faces of hinges, so that when the two leaves, usually called the "male" and the "female," are brought together and united by a joint-pin, they will not bind in the joint upon each other.

In all the modifications of the machine shown in the drawings the same general principle is employed, and which is exhibited in the combination of one or more revolving milling or facing tools, a table of peculiar construction to hold the hinge-leaves, and made specially adjustable to the milling tool or tools, and, when the hinge is other than a "loose-joint" butt, suitable mechanism for causing the milling-tools to be simultaneously moved sidewise up against the respective faces of the joint which they are to dress.

In the several drawings, A represents a suitable frame, upon which all the parts of the machine are mounted. Referring to Figs. 1 and 7, (the former being a duplication of the latter, and representing a machine adapted to dress the four-joint male leaf, Fig. 3, while the machine shown at Fig. 7 is required to dress only the male leaf of a two-joint hinge, Fig. 8,) B B' are U-shaped standards, similar to those found in the head-stocks of turning-lathes. They are capable of endwise adjustment on the frame to accommodate hinges of different sizes, and are provided with journals, in which is mounted an arbor, C, of peculiar construction. D is a pulley, by which the belt is applied to cause the arbor C to revolve. The arbor C is composed of an exterior hollow sleeve, $a$, and an interior shaft, $b$, Fig. 2, which are united by a spline-connection, which compels the two to revolve together, but permits them to slide longitudinally with respect to each other. Upon the end of the sleeve $a$, and also upon the end of the shaft $b$, is secured a milling-tool, $c$, having cutting-teeth upon its face, and not upon its edge, as shown at Fig. 4. The sleeve $a$ and the shaft $b$, so constituting the arbor C, extend beyond the back faces of the standards B, and are furnished with circular wedge-faced heads $d$ $d'$. These heads can be spread farther apart, and, in consequence, the milling-tools $c$ $c$ made to approach each other, by means of a wedge, $e$, Figs. 2 and 7, which is attached to an arm, E, arranged to overhang the heads $d$ $d'$, which arm is keyed to a rocker-shaft, F, Fig. 1, set in boxes $f f$, the said shaft being rocked at pleasure by the operator through the means of the foot-treadle lever G by the arrangement shown at Fig. 4, or in any other convenient way, whereby the wedge $e$, when the treadle is depressed, is forced between the heads $d$ $d'$ and separates them. A coiled spring, $g$, causes the milling-tools $c$ $c$ to separate to the extent to which the said heads $d$ $d'$ require to move to come into contact whenever the wedge $e$ is lifted from between the contiguous faces of the heads, Fig. 1.

Figure 6:
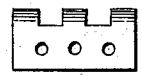
Figure 10:
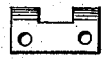
Figure 11:
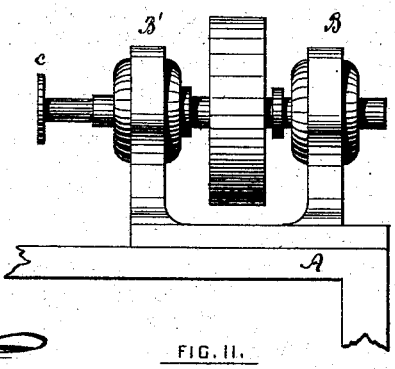

The organization of the machine is the same, if a female leaf, Figs. 6 and 10, is to be dressed, in all respects as above described, with the exception that in this case the milling-tools are required to separate from each other to come into contact with the faces of the joint which they are to dress, and, consequently, the spring $g$, instead of being placed between the milling-tools, is located, as shown at $g'$, Figs. 5 and 9, between the revolving wedge-faced heads $d\ d'$; and, instead of a single wedge, $e$, being used to cause the milling-tools to approach each other, a compress, H, having two inclined planes, with faces looking toward each other, is substituted, the effect of which is, when the treadle G is depressed, to cause the milling-tools to recede from each other and be brought up against the faces of the joint of the female leaf, the operation being the reverse of that described when a male leaf is to be dressed.

The table upon which the hinge-leaf is to be placed while being operated upon is shown at I, Figs. 1 and 4. Its front edge is provided with lips $h\ h$, which are depressed below the general plane of an adjustable gage-plate for different-sized hinges, which forms the top of the table, and are made concave to receive and support the knuckles of the leaves. These lips extend inward toward the axes of the milling-tools, so that the knuckle of the hinge-leaf when placed thereon will occupy a position within the circles in which the periphery of the milling-tools revolve, and have its axis perpendicular to the planes of the cutting-faces of the mills. It is very desirable that the table should be adjustable vertically, radially, and angularly with reference to the milling-tools. Accordingly, it is mounted on an arm, $i$, Fig. 4, which is pivoted at $i'$ to a standard, $k$, which latter is set in guides $k'$, and is capable of being elevated or depressed by means of an adjusting-screw, $m$. A curved arm, $n$, and a clamp-screw, $n'$, furnish the means for the radial and angular adjustment required.

A table not made adjustable as above described, but fixed in position with reference to the milling-tools, and properly constructed to hold the leaf of the hinge, could be used with very great advantage, but such machine would involve a material part of my invention.

The operation of the machine is as follows: If a male leaf, Fig. 3, is to be dressed, (the table I having been first properly adjusted to receive the leaf,) the leaf is placed on the table, with its knuckles between the milling-tools, which are now separated by their greatest distance. The operator now puts his foot on the treadle G, which, as before explained, causes the two revolving cutters of each pair to approach each other, and in doing so they come into contact with the faces of the knuckles, and dress simultaneously all four of them. When the operator removes the pressure upon the treadle the spring $o$, Fig. 4, pressing against the downward extension of the arm E, causes the wedge $e$ to be lifted, when the reaction of the springs $g$ separates the cutters, so that the leaf of the hinge can be removed and give place to the next. In case a female leaf, Fig. 6, is to be dressed, the table of the machine is changed to suit the difference in form of the leaf. The compress H is substituted for the wedge $e$, and the spring $g$ is removed from between the milling-tools and placed between the wedge-faced heads $d\ d'$ at $g'$. With this change the machine is adapted to dress female hinge-leaves.

Figure 12:
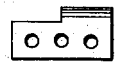

For dressing the joints of loose butt-hinges, Fig. 12, only one milling-tool, Fig. 11, is necessary; consequently the devices for causing the milling-tools used in the machines shown at Figs. 1, 5, 7, and 9, to approach toward or to recede from each other, are not required, and are dispensed with. A table, however, is needed of the same character as that above described, upon which the leaf is to be placed. To dress the joint the operator should lay the leaf with its knuckle in the concave supporting-lip of the table, and using, in this case, the lip as a guide to keep the hinge in proper alignment, press the leaf by hand against the revolving milling-tool until it is dressed.

I wish it understood that I do not limit myself to a construction which requires the milling-tools to move laterally with reference to the table. It is obvious that the table can be arranged to move laterally with reference to the milling-tools; and although in the latter case all the faces of the knuckles would not be dressed simultaneously, and the machine be thereby inferior in efficiency to the one which I have described, it would, if it contained a suitable table for holding the hinge-leaf described, employ substantially my invention.

What I claim as my invention, and desire to secure by Letters Patent, is—

1. In a machine for dressing the faces of the knuckle-joints of hinges, the combination, substantially as described, of a suitable table, I, having projecting recessed lips $h\ h$, for the reception of the hinge-knuckle, with one or more milling-tools, $c$, having their cutting-faces revolving in planes which will be perpendicular to the axis of the knuckle when placed on the lips, as specified.

2. The combination of revolving milling-tools $c\ c$, arranged in pairs, with suitable mechanism, as described, for causing the cutting-faces of each pair to approach toward or recede from each other, and a table, as described, for holding a hinge-leaf in proper position while the faces of the knuckle-joints are being dressed by the milling-tools, substantially as specified.

3. In combination with a revolving milling tool or tools, $c$, as described, a table, I, made adjustable vertically, radially, and angularly relatively to such milling-tools, substantially as specified.

J. WARREN TUCK.

Witnesses:
  HENRY J. SPOONER,
  EDWARD GOODWIN.